May 29, 1956     A. G. F. WALLGREN     2,747,951

ROLLER BEARING

Filed Oct. 9, 1953

United States Patent Office 2,747,951
Patented May 29, 1956

2,747,951

ROLLER BEARING

August Gunnar Ferdinand Wallgren, Goteborg, Sweden

Application October 9, 1953, Serial No. 385,230

Claims priority, application Sweden October 10, 1952

6 Claims. (Cl. 308—214)

My invention relates to roller bearings comprising an outer and an inner annular bearing member and rollers disposed therebetween, a flange secured to one of said members being provided to guide said rollers in axial direction. In a roller bearing of the kind set forth having cylindrically shaped rollers and intended to be subjected to radial load only, there will not be produced any axial or thrust forces pressing the rollers against the guide flanges located on either side of the rollers and secured, for example, to the inner bearing member. The same conditions exist in the case in that the bearing comprises two rows of rollers having the shape of symmetrical drums and co-operating with a spherical roller track or bearing race on the outer bearing member. However, in such spherical roller bearings the rollers of which are not symmetrical but have a larger diameter at their inner end than at their outer end, the normal pressure even with only radial load will produce a minor axial force pressing the roller upwards against the guide flange which in this construction is located centrally relative to the inner bearing member. This holds true also for bearings with one or two part-conical roller tracks or bearing races and a corresponding shape of the rollers inclined with respect to the axis of the bearing. Axial forces are thus produced between the rollers and the guide flange irrespective of whether the load acts radially or axially though in the latter case said forces will be many times greater.

The end faces of the rollers slide against the guide flange, for which reason the bearing actually is a combined roller and slide bearing. The relative sliding speed between the rollers and the guide flange is somewhat smaller when the guide flange is secured to the outer bearing member than in the case where said flange is secured to the inner member, and it is approximately equal to the speed of the rollers relative to the spacing or retainer member ensuring the peripheral spacing between the rollers. Said speed is of an order of magnitude approximately equalling half of the peripheral speed of the inner annular bearing member. It will thus be easily understood that the sliding speed is considerable in which connection it is also to be observed that the lubricating grease ordinarily used in bearings of the type set forth is less suitable to form a supporting film between the sliding surfaces. As a result thereof the surfaces of the rollers and the guide flange abutting against one another are soon worn and the life of the bearing is reduced correspondingly.

One object of my invention is to provide a roller bearing of the kind specified which is free from the aforesaid deficiencies.

My invention is with particular advantage applicable to double row roller bearings of the type disclosed for example in the patents to Wallgren Number 2,489,342, granted November 29, 1949, and Number 2,622,947 granted December 23, 1952, and co-pending application Serial Number 322,470, filed November 25, 1952 comprising a retainer member composed of separating or spacing members or claws projecting between the rollers in each roller row and united only at the outer side of the bearing by means of an annular holder or cage member. In this type of bearing the roller tracks or bearing races as well as the rollers are of conical shape and the axes of the rollers are inclined with respect to the axis of the bearing so that the roller track or race on the outer annular bearing member has a diameter increasing toward the centre of said annular member where the guide flange is located. In order to be able to insert a desired number of rollers the outer bearing member, in a manner disclosed in the above mentioned patents, is subjected to an elastic deformation necessitating a separate annular member intended to reduce the sliding friction between the abutting surfaces of the rollers and the guide flange to be inserted with a clearance relative to said outer bearing member in order to permit said deformation. On the other hand, the inclination of the roller tracks or bearing races with respect to the axis of the bearing is so great that said annular member even when given the shape of a washer cannot be forced into the bearing from one side thereof. It is a further object of my invention to provide means permitting the insertion of said washer-shaped separate annular member.

Further objects and advantages of my invention will be apparent from the following description considered in connection with the accompanying drawing, which forms part of this specification, and of which:

Figure 1:
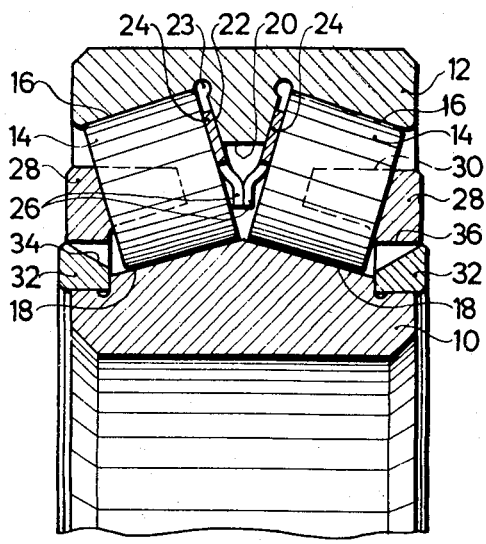
Fig. 1 is an axial sectional view of a portion of a double row roller bearing constructed according to my invention.

Referring to the drawings, 10 designates the inner ring of the bearing and 12 the outer ring thereof, between which are inserted two rows of preferably part-conical rollers 14. The ring 12 is provided with two roller tracks or bearing races 16 of part-conical or approximately part-conical shape, one for each row of rollers, the diameter of which increases in a direction toward the centre of the outer ring. Likewise the inner ring 10 is provided with two part-conical or approximately part-conical roller tracks or bearing races 18, one for each row of rollers, the diameter of which as well as the conical surfaces of the rollers converge so as to form a portion of the outer surfaces of cones having their apices meeting at a common point on the axis of the bearing, said point being located on the same side of the median transverse plane of the bearing as the row of rollers under consideration.

The outer ring 12 has a central guiding flange 20, the lateral faces 22 of which each forms a portion of a conical surface with the apex turned toward the interior of the bearing, or a portion of a sphere the centre of which is located at the point of the intersection of the median axes of the rollers and of the bearing, respectively. Between the flange faces 22 and the races 16 are provided clearances 23 for the grinding wheel. Against each of the faces 22 of the guide flange abuts a washer-like annular member 24 of a suitable bearing metal which term in the present connection is understood to mean a metal or a metal alloy having more favorable properties regarding friction than the friction values obtainable when the rollers 14 made of steel slide on surfaces also consisting of steel. Said bearing metal may be, for example, lead bronze or phosphor bronze.

The washer-like members 24 have an outer diameter exceeding the minimum diameter of the races 16 while at the same time being smaller than the diameter of the clearances 23 or the races 16 adjacent said clearances in order to permit deformation of the outer ring 12 without any plastic change of form of said members when inserting the rollers 14 in the manner disclosed in my aforementioned patents. The washer-like members may project over the inner peripheral face of the guide flange 20 tapering toward the axis of the bearing. Suitably said members are provided with circumferentially spaced projections or lugs 26 the adjacent ends of which are bent to contact one another and interconnected by spot welding or like connecting means. In this way the washer-like members are centered by the lateral faces 22 of the guide flange 20.

Figure 2:
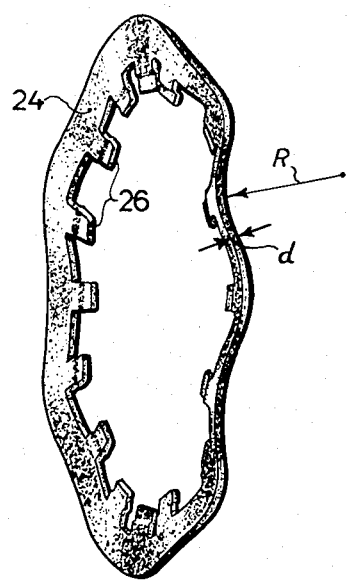
Fig. 2 is a perspective view of a washer-shaped separate annular member forming part of the bearing shown in Fig. 1.

In order to be adapted to be inserted into the outer ring 12 the washer-like members 24 are preferably given a waved shape as illustrated in Fig. 2 by elastic deformation by means of a tool suitable for this operation. The direction of the waves is peripheral, the wave tops and troughs substantially extending in radial direction. Due to the feature that the outer diameter of the member is diminished by the corrugating operation, the member can be inserted into the outer ring. The radius R of the corrugations is so dimensioned relative to the thickness d of the member that the deformation stresses remain below the yield limit. When the member then is allowed to resume its plane shape, its diameter increases again.

Each row of rollers has a retainer member comprising a retainer ring 28 and spacing members or claws 30 projecting between the rollers and preferably made integral with said ring. The position of the retainer member within the bearing is maintained by a holder ring 32 rigidly secured to the inner ring 10 by shrinking the same on the ring 10 or by other known means. The holder ring is preferably provided with a sliding surface 34 having an at least approximately part-spherical configuration with the centre of the radius determining the curvature of said surface located on or near the axis of the bearing. Co-operating with the sliding surface 34 is a sliding surface of corresponding form provided on the retainer ring 28. In other words, the sliding surfaces are shaped so as to permit the retainer ring 28 to assume an inclined position relative to the holder ring as a result of the driving force emanating from the rollers on the spacing members 30 without any danger of becoming wedged. The retainer ring 28 is preferably provided with circumferentially spaced lubricating grooves 36. Roller bearings of the type under consideration are described in the U. S. specification of my aforesaid copending application Serial No. 322,470 which is referred to for a more detailed description of the shape of the retainer member and the holder ring.

The invention may be applied to bearings having spherical roller tracks or bearing races or to bearings having the guide flange secured to the inner ring. Further, a ring of bearing metal may be applied to the interior face of the flange 20 and secured thereto by a shrinking operation, both lateral faces of said ring projecting beyond those of said flange and having a shape corresponding to the end faces of the rollers. In bearings where the rollers are inserted during oval deformation of the outer ring as described above, the ring shrunk onto the flange 20 is subjected to such deformation. The thickness of the ring in the radial direction is then limited by the yield limit and the modulus of elasticity. The yield limit is not permitted to be exceeded, because in such a case the shrunken ring would become loosened. A ring made of bearing metal such as brass or bronze, for example, expands more than the outer ring made of steel. A bearing must stand some overheating to about 150° C., for example. For this reason it is of essential importance that the radial extent of the ring and the grip due to its shrinking onto the flange are determined with due regard to the different linear expansion coefficients and resistance properties so as always to ensure the ring maintaining sufficient grip.

While one more or less specific embodiment of my invention has been shown, it is to be understood that this is for purpose of illustration only, and my invention is not to be limited thereby, but its scope is to be determined by the appended claims.

What I claim is:

1. A roller bearing comprising outer and inner annular bearing members each having two conical bearing races for two rows of rollers disposed therebetween and a flange secured to one of said members for guiding said rollers in axial direction, said flange having tapering lateral faces converging toward the axis of the bearing and the races of the outer bearing member increasing in diameter in the direction toward the plane of said flange, and two separate washer-like members of anti-friction material centered on the lateral faces of said flange, said annular members each having portions projecting inwardly of said flange and formed to engage inwardly projecting portions of the other member.

2. A bearing as defined in claim 1 in which said annular members are in the form of washers restrained against rotation relative to said flange only by the friction between said members and said flange.

3. A roller bearing comprising outer and inner annular bearing members each having two conical bearing races for two rows of rollers disposed therebetween and a flange secured to one of said members for guiding said rollers in axial direction, said flange having tapering lateral faces converging toward the axis of the bearing and the races of the outer bearing member increasing in diameter in the direction toward the plane of said flange, and two separate washer-like members of anti-friction material centered on the lateral faces of said flange, said annular members having portions projecting inwardly of said flange and said portions being connected.

4. A bearing as defined in claim 3 in which the connected portions of said members comprise a plurality of circumferential spaced projections.

5. The method of assembling a bearing of the kind defined in claim 3 which includes the steps of corrugating the separate washer-like members to wave-like form to reduce the outer diameters thereof as compared with their normal diameter when in plane washer-like form, introducing said members of reduced diameter into the outer bearing member past the outer ends of smaller diameter of the bearing races of said outer member, and thereafter permitting said washer-like members to resume their original shape, with a resultant increase in the outer diameters thereof.

6. The method as defined in claim 5 in which said washer-like members are elastically deformed.

References Cited in the file of this patent

UNITED STATES PATENTS

| 986,453 | Gillette | Mar. 14, 1911 |
| 1,072,667 | Smith | Sept. 9, 1913 |
| 1,972,140 | Frank | Sept. 4, 1934 |
| 2,130,379 | Chilton | Sept. 20, 1938 |

FOREIGN PATENTS

| 77,887 | Sweden | Sept. 11, 1931 |
| 493,886 | Great Britain | Oct. 17, 1938 |